(12) United States Patent
Sathyanarayan

(10) Patent No.: US 11,724,827 B2
(45) Date of Patent: Aug. 15, 2023

(54) ROTATIONAL TECHNOLOGIES FOR SPACE INFRASTRUCTURE

(71) Applicant: Valor Robotics, LLC, Daytona Beach, FL (US)

(72) Inventor: Deepak Sathyanarayan, Ormond Beach, FL (US)

(73) Assignee: Valor Robotics, LLC, Daytona Beach, FL (US)

( * ) Notice: Subject to any disclaimer, the term of this patent is extended or adjusted under 35 U.S.C. 154(b) by 0 days.

(21) Appl. No.: 17/548,464

(22) Filed: Dec. 10, 2021

(65) Prior Publication Data

US 2023/0002084 A1    Jan. 5, 2023

Related U.S. Application Data

(60) Provisional application No. 63/123,946, filed on Dec. 10, 2020.

(51) Int. Cl.
  *B64G 1/10*   (2006.01)
  *B64G 1/40*   (2006.01)
  *B64G 1/64*   (2006.01)

(52) U.S. Cl.
  CPC ........... *B64G 1/1078* (2013.01); *B64G 1/402* (2013.01); *B64G 1/646* (2013.01)

(58) Field of Classification Search
  CPC ...... B64G 1/1078; B64G 1/281; B64G 1/402; B64G 1/646
  See application file for complete search history.

(56) References Cited

U.S. PATENT DOCUMENTS

| | | | | |
|---|---|---|---|---|
| 3,862,732 A * | 1/1975 | Wyatt | ..... | B64G 1/402 244/171.1 |
| 5,058,834 A * | 10/1991 | Hubert | ..... | B64G 1/244 244/164 |
| 5,305,970 A * | 4/1994 | Porter | ..... | B64G 1/12 244/135 R |
| 7,559,508 B1 * | 7/2009 | Taylor | ..... | B64G 1/242 244/172.3 |
| 8,048,211 B2 * | 11/2011 | Behruzi | ..... | F17C 13/088 55/444 |
| 8,196,868 B2 * | 6/2012 | Kutter | ..... | F17C 3/04 244/172.3 |
| 8,196,869 B2 * | 6/2012 | Kutter | ..... | B64G 1/222 244/172.3 |
| 9,676,499 B2 * | 6/2017 | Myers | ..... | B64G 1/646 |

(Continued)

OTHER PUBLICATIONS

International Search Report and Written Opinion, PCT/US2021/062967, dated Sep. 8, 2022, 8 pages.

(Continued)

*Primary Examiner* — Benjamin P Lee
(74) *Attorney, Agent, or Firm* — Potomac Law Group, PLLC; John J. Penny, Jr.

(57) ABSTRACT

A spacecraft refueling and storage system comprising a first tank and a second tank for storing propellant, a rotatable shaft to which the first and second tanks are mounted for rotating the first and second tanks about an axis of the shaft, and a drive motor for rotating the shaft so that upon rotation of the first and second tanks, liquid propellant is separated from gas in the propellant and settled to an outer portion of the first and second tanks.

18 Claims, 12 Drawing Sheets

(56) References Cited

U.S. PATENT DOCUMENTS

| | | | | |
|---|---|---|---|---|
| 2009/0293729 | A1* | 12/2009 | Behruzi | F17C 13/088 220/560.04 |
| 2010/0187364 | A1* | 7/2010 | Kutter | B64G 1/54 62/51.1 |
| 2010/0187365 | A1* | 7/2010 | Kutter | B64G 1/1078 62/53.2 |
| 2012/0091280 | A1* | 4/2012 | Kutter | B64G 1/402 244/171.7 |
| 2016/0207641 | A1 | 7/2016 | Myers et al. | |
| 2019/0023419 | A1 | 1/2019 | Helvajian | |

OTHER PUBLICATIONS

Silvernail, N, et al., "Investigation to Determine Resonant Behavior from Propellant Slosh in Spinning On-Orbit Propellant Storage and Transfer Systems" AIAA 2011-2000. American Institute of Aeronautics and Astronautics. Online. Jun. 14, 2012, 4 Pages.

Silvernail, N. "Spacecraft On-Orbit Advanced Refueling System" National—Fall 2012. Space Grant National and Regional Meeting Presentation Archive. Online. Oct. 31, 2012; ; Retrieved from the internet: url:http://national.spacegrant.org/meetings/presentations/Fall2012/Nathan_Silvemail.pdf; 18 Pages.

Duraisamy et al., "Design, Development and Testing of a Suborbital NanoLab Research Experiment in Microgravity", AIAA Space Forum, Sep. 12-14, 2017, Orlando, FL, AIAA Space and Astronautics Forum and Exposition.

Lenahen et al., "A Comparison Investigation of Experimental and Computational Fuel Slosh Models Utilizing Diaphragm-Implemented Spacecraft Propellant Tanks", AIAA 53rd Structures, Structural Dynamics and Materials (SDM) Conference 20th, Honolulu, Apr. 23-26, 2012, Honolulu, Hawaii.

Lenahen et al., "A Computational and Experimental Analysis of Spacecraft Propellant Tanks Implemented with Flexible Diaphragms", Structures, Structural Dynamics, and Materials and Co-located Conferences, Apr. 8-11, 2013, Boston, Massachusetts, 54th AIAW/ASME/ASCE/AHS/ASC Structures, Structural Dynamics, and Materials Conference.

Lenahen et al., "A Computational Investigation for Determining the Natural Frequencies and Damping Effects of Diaphragm-Implemented Spacecraft Propellant Tanks", AIAA 53rd Structures, Structural Dynamics and Materials (SDM) Conference, Honolulu, Apr. 23-26, 2012.

Leuva et al., "A CFD Study of Cryogenic LH2 Tank Ullage Pressurization", AIAA 53rd Structures, Structural Dynamics and Materials (SDM), 20th, Apr. 23-26, 2012, Honolulu, Hawaii.

Llanos et al. "Educating the Space Scientists at Embry-Riddle through Design, Build and Fly Rocketry Experience", AIAA SciTech Forum, Jan. 7-11, 2019, San Diego, California, AIAA Scitech 2019 Forum.

Llanos et al., "Challenges of ERAU's First Suborbital Flight Aboard Blue Origin's New Shepard M7 for the Cell Research Experiment In Microgravity (CRExIM)", Gravitational and Space Research, DOI: 10.2478/gsr-2019-0001 GSR, 2019.

Llanos et al., "Educational Experiences and Lessons Learned in the Multidisciplinary Design, Fabrication, Integration and Flight Testing of Embry-Riddle High Altitude Science Engineering Rig (ERHASER) Payload aboard NASA's WB-57 Aircraft", American Society for Engineering and Education Southeastern conference 2018.

Nazario et al., "Mass Gauging and Validation of a Novel In-Space Propellant Storage and Transfer using CFD", AIAA Space Forum, Sep. 12-14, 2017, Orlando, FL, AIAA Space and Astronautics Forum and Exposition.

Santhanam et al., "A Computational Approach to Slosh Damping with Floating Magnetoactive Micro-baffles", AIAA SciTech Forum, Jan. 5-9, 2015, Kissimmee, Florida, 53rd AIAA Aerospace Sciences Meeting.

Silvernail et al., "An Investigation to Advance the Technology Readiness Level of the Centaur Derived On-orbit Propellant Storage and Transfer System", Spring 2013.

Silvernail et al., "Investigation to Determine Rotational Stability of On-Orbit Propellant Storage and Transfer Systems Undergoing Operational Fuel Transfer Scenarios", AIAA 53rd Structures, Structural Dynamics and Materials (SDM) Conference, Honolulu, Apr. 23-26, 2012.

Sivasubramanian et al., "A Hybrid Magneto-active Propellant Management Device for Active Slosh Damping in Spacecraft", AIAA SciTech Conference, Jan. 2015.

Vairamani et al., "An Investigation of the Magneto-Active Slosh Control for Cylindrical Propellant Tanks Using Floating Membranes", AIAA SciTech Forum, San Diego, Jan. 2019.

Vairamani et al., "Stability Analysis of a Novel On-Orbit Propellant Storage and Transfer System", AIAA SciTech Forum, Jan. 8-12, 2018, Kissimmee, Florida, 2018 Space Flight Mechanics Meeting.

* cited by examiner

Conceptual Overview of SOARS Subsystems

ROTATIONAL TECHNOLOGIES FOR SPACE INFRASTRUCTURE

CROSS-REFERENCE TO RELATED APPLICATION

The present application claims the benefit under 35 U.S.C. § 119 to U.S. provisional application No. 63/123,946 filed Dec. 10, 2020, the entirety of which is hereby incorporated by reference.

FIELD OF USE

This present invention relates generally to rotational technologies for space infrastructure including, for example, a spacecraft on-orbit advanced refueling system (SOARS), and more particularly a device and method for storing and transferring fluid/propellant in low, high or zero gravity environments.

BACKGROUND

Space vehicles traveling beyond low earth orbit (LEO) require large amounts of liquid propellant not only to escape the gravitational pull of the Earth, but also to position the spacecraft in geosynchronous and transfer orbits. Orbiting propellant depots can extend the life and mission profile of space vehicles. However, in microgravity conditions, propellants inside the tank are dispersed randomly, and it can be difficult to predict their behavior. Also, the chaotic nature of fluid behavior in reduced gravity environments limit the assessment and management of space fluids for extraterrestrial applications. In-space refueling from an orbiting propellant depot can be used to extend the range and mission capabilities of these space vehicles. However, current in-space propellant transfer methods rely on expensive and heavy pumps and diaphragms that do not provide sufficient high transfer efficiency or reliability. These methods that rely on heavy pumps and pressurized inert gases are prone to accelerated boil-off and do not maintain propellant in usable and sustainable conditions long-term. Also, these methods require significant resources for liquid acquisition and utilize fault-prone components. Further, these methods require a separate supply of stored gases to generate high pressures for fluid separation. In addition, in microgravity conditions, propellants inside the tank are dispersed randomly, and it can be difficult to predict their behavior. Utilization of cryogenic resources is further limited by advanced thermal and structural operating requirements.

SUMMARY

There is a need for fluid management systems for space depot platforms that can maintain propellant in usable and sustainable conditions in reduced gravity environments in order to support the growing demand for LEO, cislunar and deep space exploration capabilities.

At least one embodiment of the storage system disclosed herein comprises a first tank and a second tank for storing propellant, a rotatable shaft to which the first and second tanks are mounted for rotating the first and second tanks about an axis of the shaft, a drive motor for rotating the shaft so that upon rotation of the first and second tanks, liquid propellant is separated from gas in the propellant and settled to an outer portion of the first and second tanks, a first flow path formed in the shaft, a second and third flow path for transferring the settled liquid in the first tank and the second tank, respectively, to the first flow path, and a fourth flow path for transferring fluid from the first flow path to the spacecraft.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be more fully understood by reference to the detailed description, in conjunction with the following figures, wherein.

DETAILED DESCRIPTION

Figure 1:
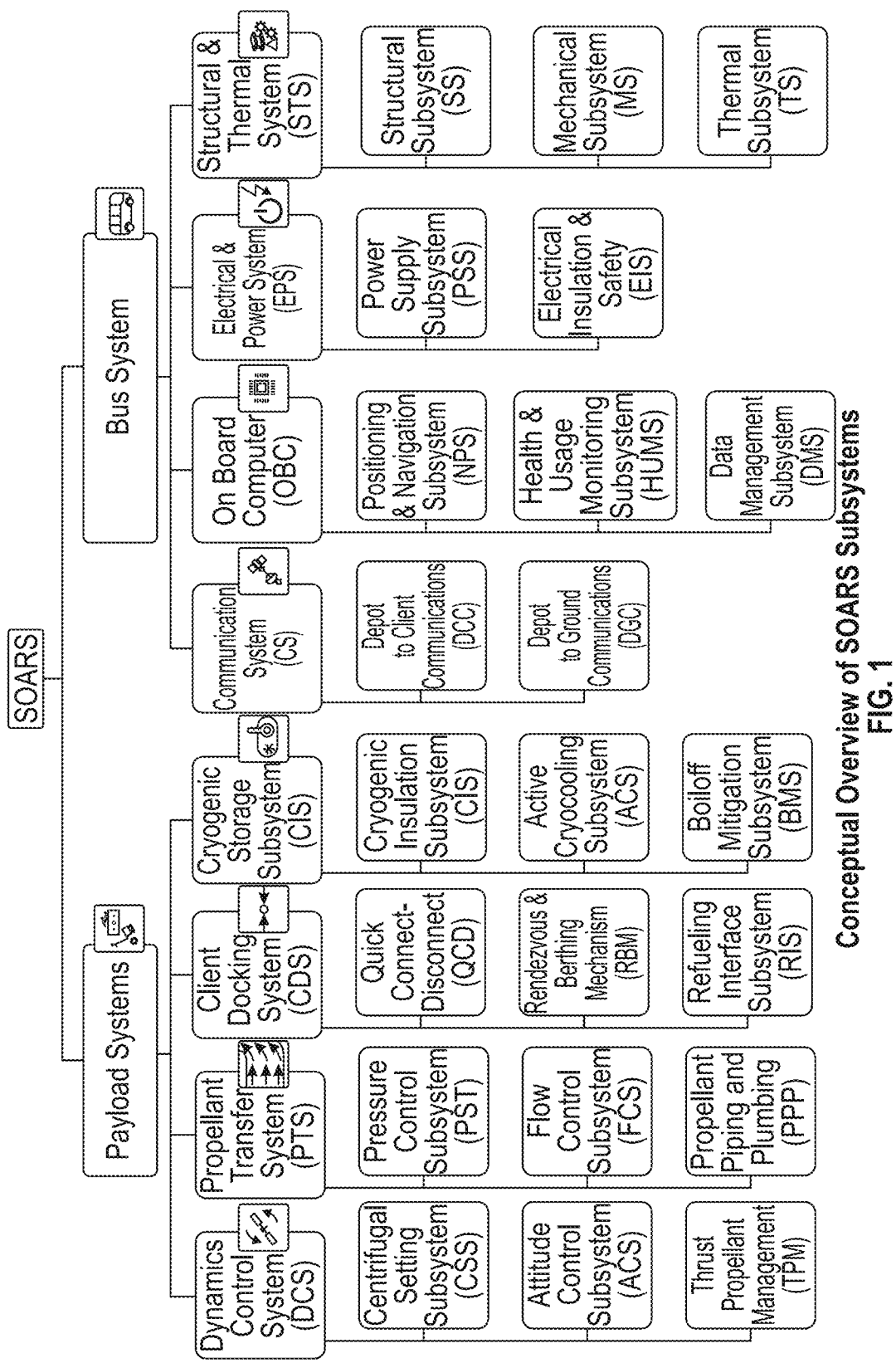
FIG. 1 shows the systems and subsystems of one embodiment of a spacecraft on-orbit advanced refueling system (SOARS) of the present invention.

The subject innovation is now described with reference to the drawings, wherein like reference numerals are used to refer to like elements throughout. In the following description, for purposes of explanation, numerals specific details are set forth in order to provide a thorough understanding of the present invention. It may be evident, however, that the present invention may be practiced without these specific details.

FIG. 1 shows the systems and subsystems of one embodiment of a spacecraft on-orbit advanced refueling system (SOARS) of the present invention. Payload Systems can encompass technologies and mechanisms that drive depot kinematics and transfer dynamics. Bus Systems can include depot infrastructure and communications that support and operate Payload Systems. The SOARS Dynamics & Control Subsystem (DC S) can be used to initiate, control, and stabilize depot kinematics during operation. Propellant settling prior to transfer can be driven by thruster mechanisms to spin the system up-to-speed. During spin-up and transfer, the DCS can use thrusters to mitigate propellant slosh effects and settling instabilities that may emerge. If the depot configuration requires, a moving mass system can be incorporated into the DCS in integration to thrusters that can provide baseline shifts in system CG and trim instabilities. Attitude and (re-)orientation operations of the depot can be executed using existing thruster and moving mass mechanisms to maintain stability during obstacle avoidance and non-cooperative client maneuvers.

The SOARS Propellant Transfer Subsystem (PTS) can provide reliable and efficient propellant management during depot-client transfer operations. Pressure controllers and necessary valves, pressure regulators, and flowrate sensors can be used to establish and maintain necessary pressures to initiate transfer and regulate mass flow rate. Propellant piping geometry and material selection can reduce transfer path length and ensure thermochemical compatibility with target propellant (i.e. liquid hydrogen, liquid oxygen, liquid methane, hydrazine). The SOARS Client Docking System (CDS) can support client agnostic berthing and depot-client mating during transfer/maintenance operations. Upon client approach, robotic mechanisms (i.e., robotic arms, autonomous tethers, etc.) can be utilized to guide the client to the target propellant transfer port. Prototype CDS can incorporate quick connect and disconnect adapters (QC/QD) to minimize client operations during docking. Adapter construction or selection can take into account thermal and fluid characteristics of the operating propellant and client propellant tank configuration. If the client does not have SOARS QC/QD adapters (e.g., legacy satellites in LEO), on-depot tooling and robotic mechanisms can be used to access the propellant tanks.

The SOARS Cryogenic Storage System (CSS) can enable long-duration storage of cryogenic propellants for client servicing. Passive components, such as cryogenic insulative materials and shielding structures, can be used to maintain thermal requirements. For active reestablishment of cryogenic fluids, the SOARS system can incorporate cryocooling and boil-off mitigation subsystems. The SOARS Communication System (CS) can execute data transfers for depot-to-client and depot-to-ground communications. Client-facing data can be used to enable assessment of propellant transfer status during operation, including alerting by fault detection systems. Over the lifetime of depot operation, ground-based communications may be required to monitor SOARS health and provide timely maintenance and repairs.

The SOARS On-Board Computer (OBC) can manage general depot maintenance and operation signaling—balancing navigation, fault detection, sensor fusion, and data analytics. Though the DCS can drive depot rotation and stabilization actuation, the OBC can execute navigation, attitude, and positioning of the depot to ensure proper orbital mechanics. Operation-related health monitoring, usage logging, and fault detection can be catalogued, and necessary responses to depot-client state changes can be managed via the OBC. Sensor data collected during operation can be fused intelligently to provide actionable insights for autonomous depot response and ground-crew decision making.

The SOARS Electrical & Power System (EPS) can serve to provide primary power to depot sensors-actuators through the use of appropriate solar panel arrays, batteries, and insulated electrical conduits. Full-scale SOARS depots can provide client auxiliary power or re-charging capabilities using SOARS stored power. The EPS can follow safety standards to mitigate the risk of electrical fires or spark-generation in the event of EPS damage. A SOARS Structural & Thermal System (STS) can be used to structurally support the depot subsystems and provide thermo-mechanically robust platforms, mounts and actuators to withstand the centrifugal loading of the depot structures, thermal expansion-shrinking and off-nominal dynamic loads generated by berthed non-cooperative clients and ensure long-duration cryogenic-compatibility.

Figure 2A:
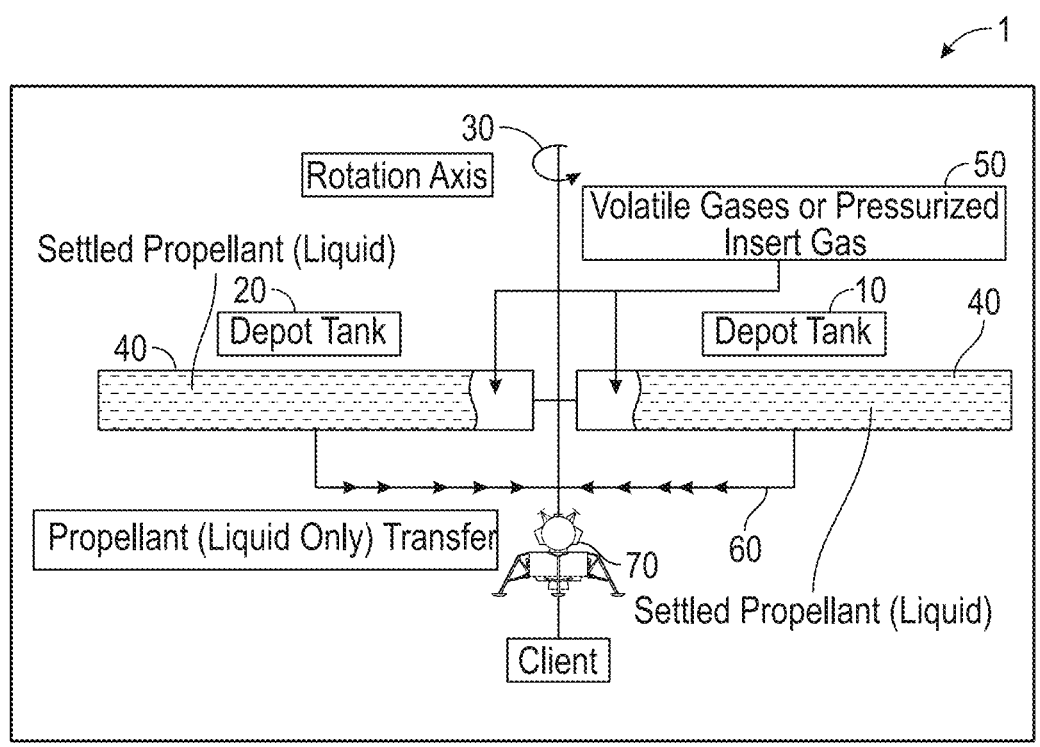
FIGS. 2A and 2B show schematic views of a device and system for storing and transferring fluid/propellant.

An exemplary embodiment of is shown in FIG. 2A. Specifically, FIG. 2A shows a schematic view of a device and system for storing and transferring fluid/propellant in low or zero gravity environments in a SOARS. As shown in FIG. 2A, the refueling device 1 rotates the depot tanks 10 and 20 about the rotational axis 30 to settle and separate the two-phase gas-propellant into liquid settled propellant 40 and volatile gas 50 using the centrifugal force caused by the rotation. The liquid settled propellant 40 is transferred to the client spacecraft 70 through transfer lines 60. This transfer can be initiated by applying a pressure differential using stored gas or boil-off gases.

Figure 2B:
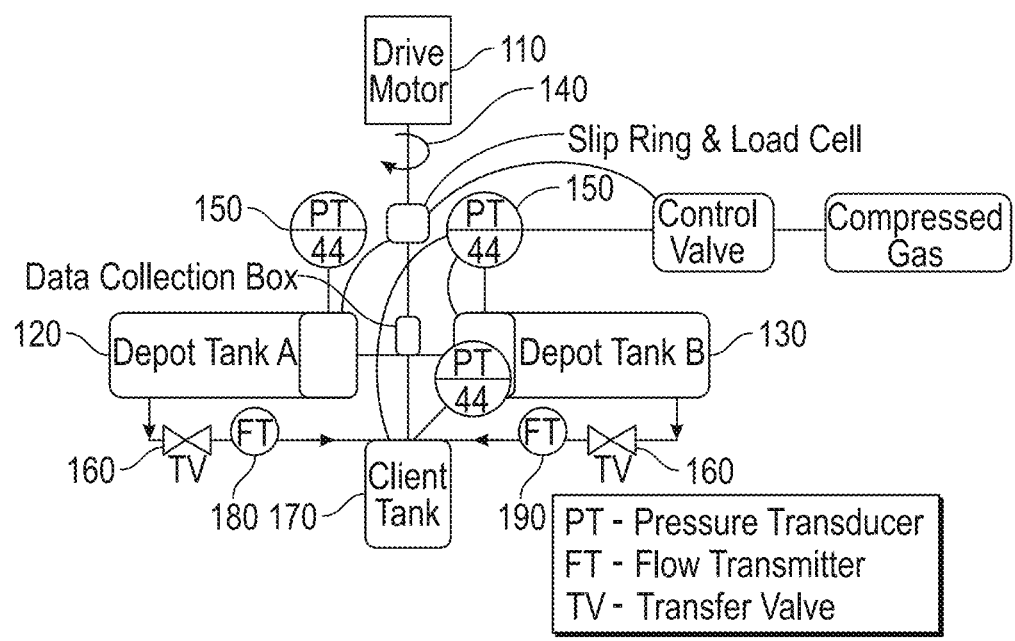

FIG. 2B shows another embodiment of the present invention. As shown in FIG. 2B, a drive motor 110 rotates depot tank A 120 and depot tank B 130 about rotational axis 140 in order to settle and separate the two-phase gas-propellant into liquid settled propellant and volatile gas using the centrifugal force caused by the rotation. Reference numeral 145 shows a slip ring and load cell. The slip ring can be used to connect and deliver electrical signals (e.g., communications, data and control signals) and the load cell can be used to measure kinetic characteristics (i.e., reaction forces and torques) between the components, which can be used to maintain stability of the system. The control valves are used to transfer fluid between the tanks and the different components of the system. Compressed gas can be used to pressurize components in the system in order to drive fluid transfer to different components. Transfer valves 160 control the flow of liquid propellant from depot tank A and B to client tank 170. The client tank 170 can include a docking interface to couple the client tank 170 to the other components of the system shown in FIG. 2B. Flow transmitters 180/190 measure the flow of propellant from the depot tanks A and B, respectively, to the client tank 170. Pressure transducers 150 measure the pressures in depot tank A and depot tank B. Although two (2) depot tanks are shown in FIG. 2B, any number of depot tanks can be used. Also, the embodiments shown in FIGS. 2A and 2B can be adaptable to orbital vehicle-mounted and surface-mounted platforms. The embodiments show in FIGS. 2A and 2B make it possible to minimize the use of expensive and failure-prone pumps and improve cryogen boil-off mitigation.

Figure 3:
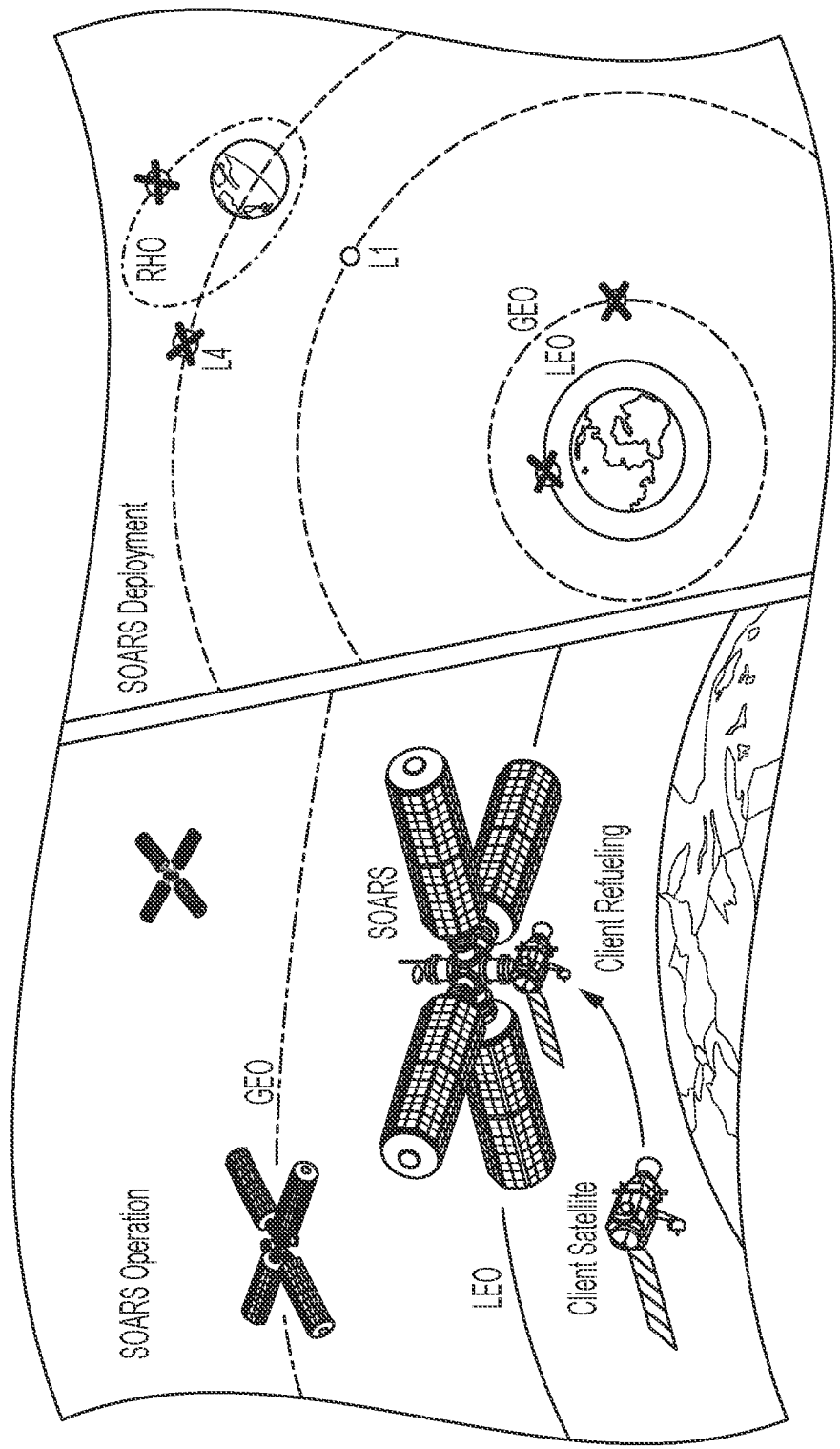
FIG. 3 shows one possible arrangement for a SOARS operation.

FIG. 3 shows one possible arrangement for a SOARS operation. As shown in FIG. 3, a client satellite can dock with the SOARS for client refueling. The SOARS can be located at various orbital positions such as low earth orbit (LEO), geosynchronous orbit (GEO), the first lagrangian point L1, the fourth lagrangian point L4, etc. The SOARS also can be used for lunar, Martian and asteroid missions.

Figure 4:
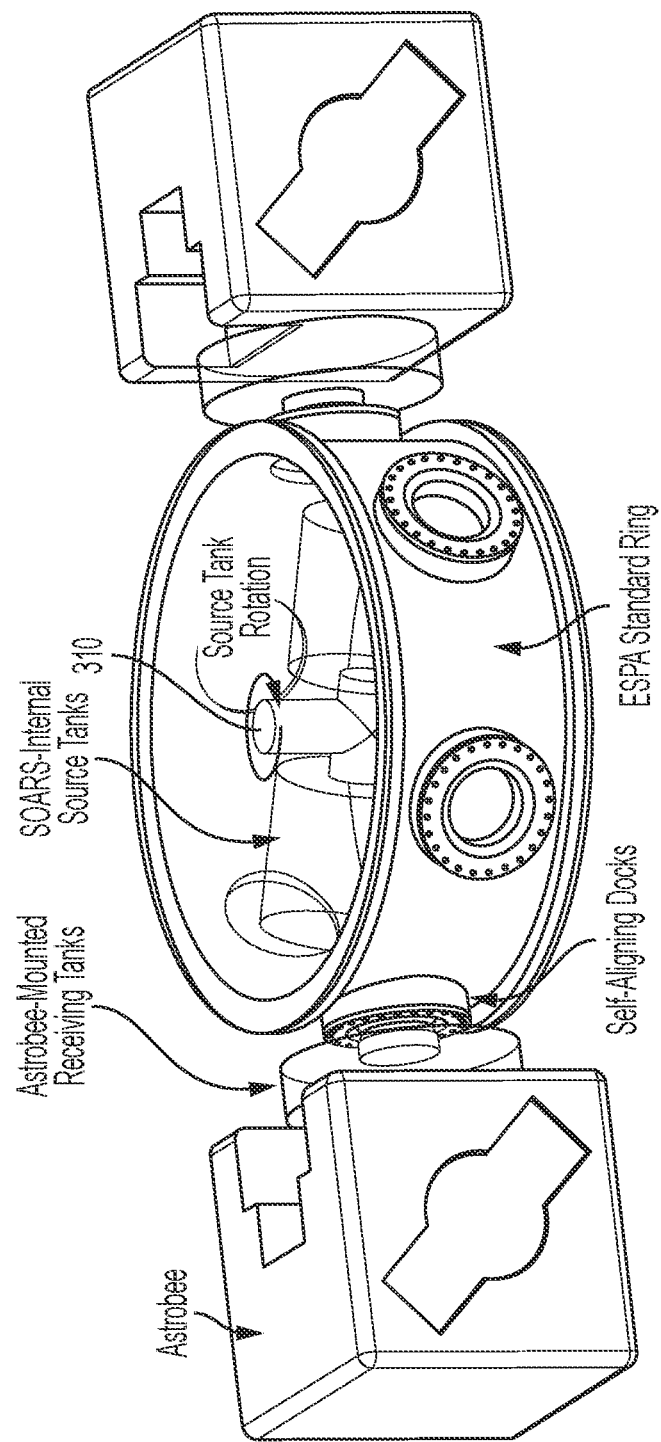
FIG. 4 shows one possible arrangement for the device for storing and transferring fluid/propellant.

FIG. 4 shows the device for storing and transferring fluid/propellant of FIGS. 2A and 2B mounted in an ESPA standard ring or housing for transferring the fluid/propellant to a receiving tank mounted on an astrobee. The astrobees can be used to maintain stability during transfer. Air pressure can be used to transfer the fluid to the astrobees. Any type of spacecraft also can be used in place of the astrobees shown in the figures. Also, the astrobees could be replaced with thrusters or use the clients' thrust mechanisms to stabilize the system. The ESPA standard ring can include any number of docking ports, which can be self-aligning docking ports, that can be used to dock multiple astrobees or spacecraft to the ESPA standard ring for refueling. The tank configuration of the system can be modular and can be scaled to a larger number of tanks and and/or larger tanks.

Also, the orientation and size of the system tanks can be configured to ensure rotational stability across all fluid distributions.

Figure 5A:
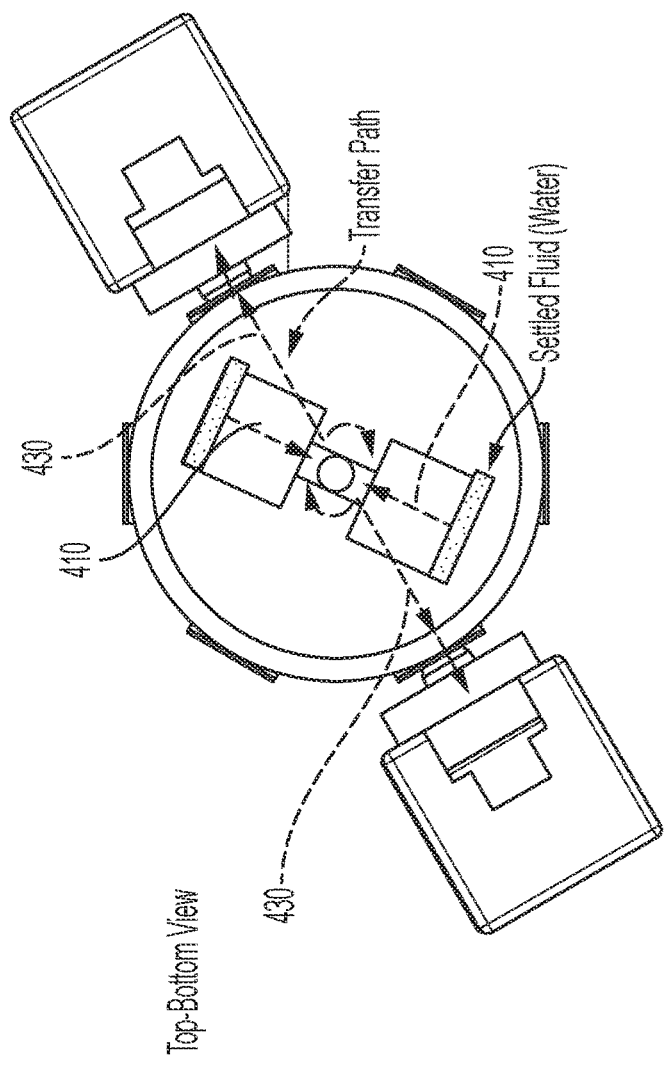
FIGS. 5A and 5B show how the fluid from the rotating tanks housed in the ESPA standard ring shown in FIG. 4 is transferred to the receiving tanks of the astrobees/spacecraft.
Figure 5C:
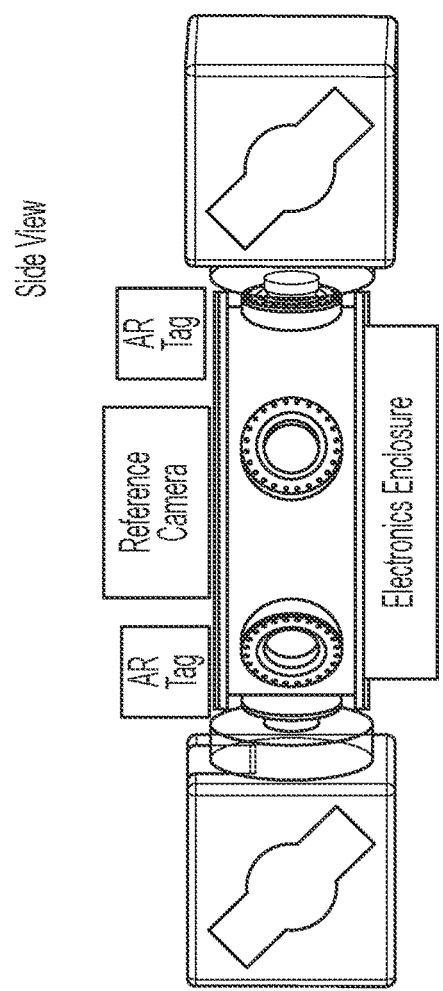
FIG. 5C shows one possible arrangement of a schematic view of the device of FIG. 4.
Figure 5B:
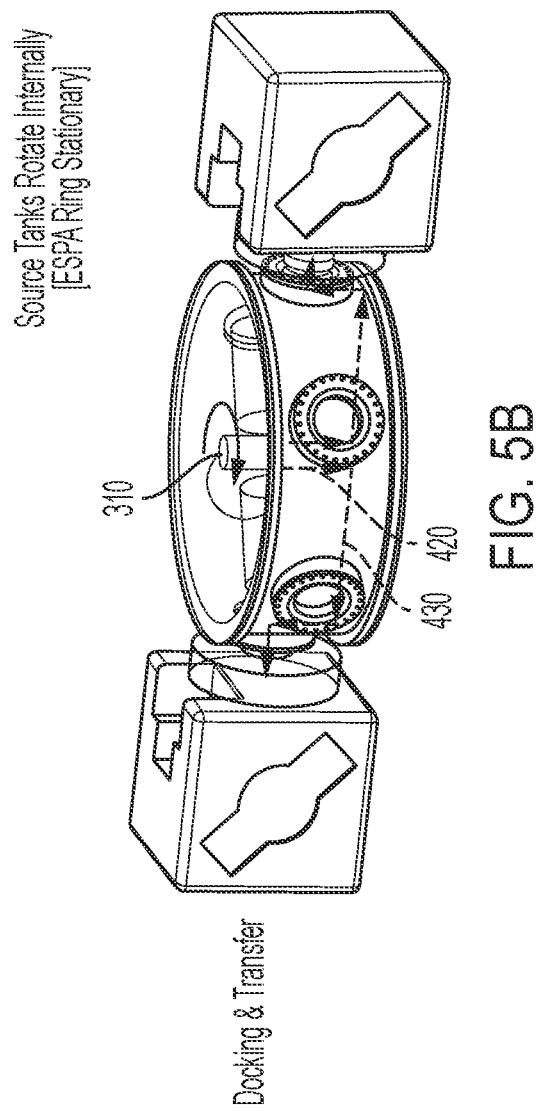

FIGS. 5A and 5B show how the fluid from the rotating tanks housed in the ESPA standard ring shown in FIG. 4 is transferred to the receiving tanks of the astrobees/spacecraft. As shown in FIGS. 5A and 5B, the rotating tanks rotate about a shaft 310. First, the fluid that has settled in the outside portion of the tanks due to the rotation is transferred through flow paths 410 to a center hub formed in the shaft 310. Then, as shown in FIG. 5B, the fluid is transferred through a pathway 420 formed in the shaft 310 to a position below the rotating tanks, and then to the receiving tanks of the astrobee/spacecraft through flow path 430 formed outside of the rotating tanks. The transfer of the fluid through the flow paths can be initiated by applying a depot-client pressure differential using stored gas or boil-off gases.

The shaft 310 can also include a rotary union and a slip ring integrated into the shaft 310 that allows fluid and electrical transfer between the rotating tanks and the shaft 310. For testing purposes, water can be used, but in operation in space, any liquid such as liquid propellant or a biological sample can be used. The flow paths can be made using NPT and/or NPTF plated brass fittings with high pressure push-to-connect seals, but any other fittings and connections could be used based on fluid handling requirements. Check valves can be placed along the flow paths to control the flow of fluid therethrough.

Figures 6A, 6B:
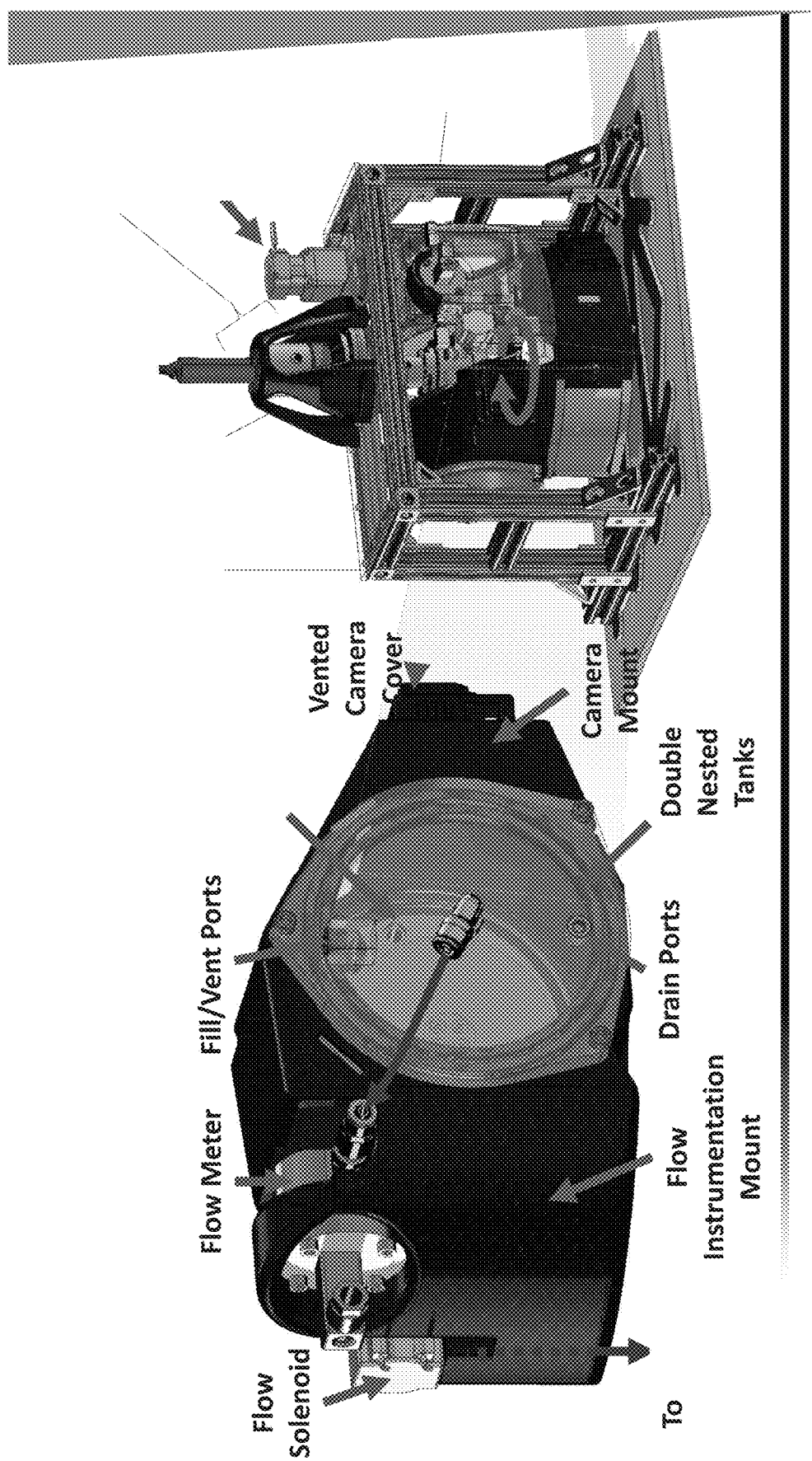
FIGS. 6A and 6B show three-dimensional views of an embodiment of the invention.

FIG. 6A shows a three-dimensional view of the rotating tanks housed in a frame 510 of one embodiment of the invention. A rotary union, slip ring and bearing 520 are positioned in a housing 530 formed on a top plate 540 of the housing 510. A motor 550 that drives the rotating tanks is also formed on the top plate 540. FIG. 6B shows one of the rotating tanks of FIG. 6A. As shown in FIG. 6B, the tank, the rotating tanks can include a camera system for monitoring and assessing internal mass distribution in the system. For example, machine vision (e.g., object recognition, density estimation, and volume estimation) can be used to assess the distribution of fluids and solids in the tank, which can be fed into a system inertia model that can predict instability using sensed kinematic and kinetic data to drive corrective actions. A mono/stereo/multi-camera system can be included as a measurement modality. The system shown in FIG. 6B also can include a flowmeter for measuring flow through the flow paths, solenoid valves along the flow paths for opening and closing the flow paths to allow liquid transfer and enable target pressurization, pressure sensors, drain ports, fill/vent ports and flow instrumentation unit.

In the system of FIGS. 6A and 6B, a brushless DC motor, for example a 15 W 1/50 HP motor with a belt-driven aluminum shaft, could be used to create an angular velocity of 60 rpm for the rotating tanks. A motor driver can be used to limit torque output and define acceleration times. For the flowmeters, a Bell Systems 10-1000 mL/min oval gear microflow meter can be used. For the pressure sensors, Omega stainless steel 0-30 psi pressure sensors can be used. The tanks can be made of double-contained (nested) acrylic or polycarbonate of an appropriate thickness of approximately ⅛", for example. The tanks can be independently face-sealed with silicone or grease against aluminum caps.

Figure 7:
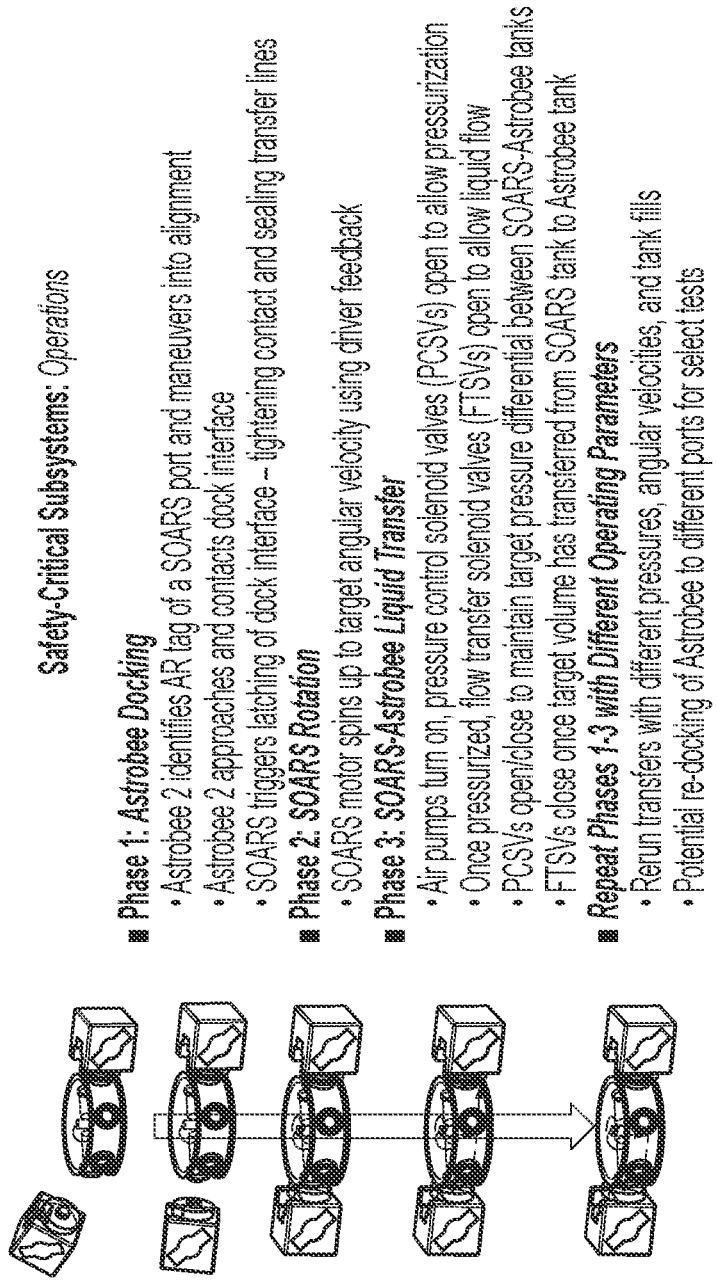
FIG. 7 shows some of the phases of operation of the transfer of fluid from the rotating tanks of the SOARS.
Figure 10:
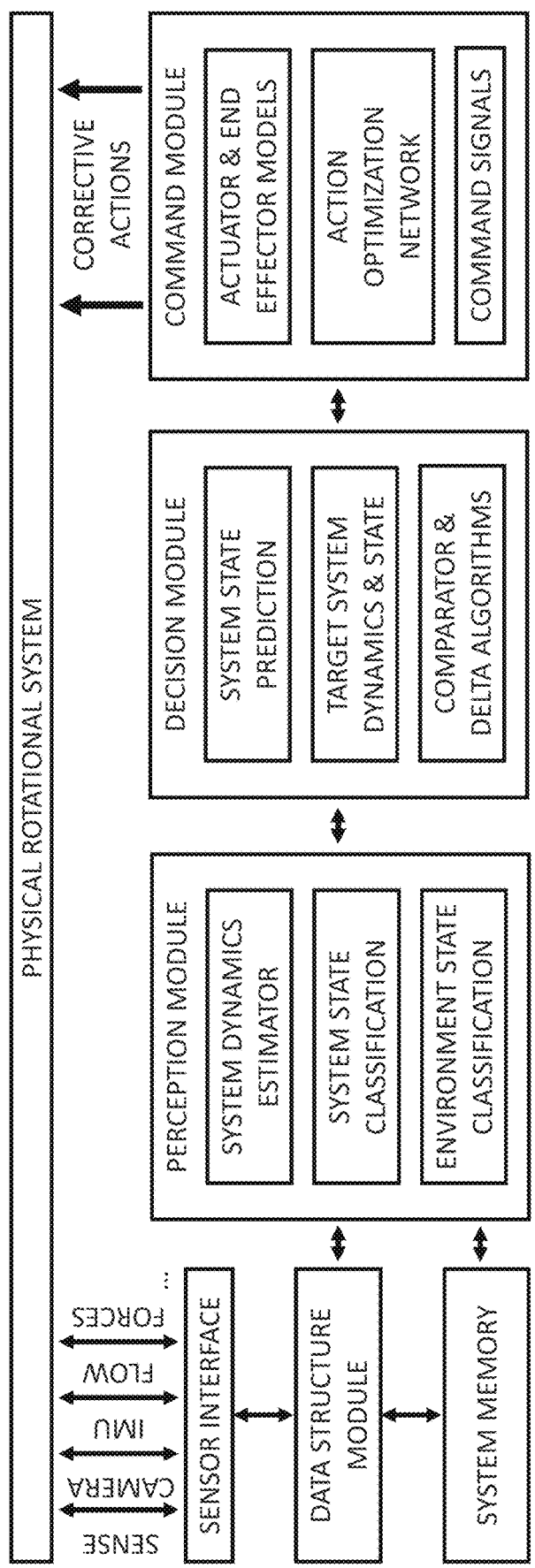
FIG. 10 shows how a microcontroller can be configured to control the operation of the SOARS.

FIG. 7 shows some of the phases of operation of the transfer of fluid from the rotating tanks of the SOARS to the astrobees. In FIG. 7, the term "astrobees" is used, but the operation can be used for any type of space vehicles, clients or recipients. One or more astrobees can be pre-docked to stabilize the ESPA ring before the docking maneuver is conducted. In Phase 1, docking of the astrobee identifies the AR (augmented reality) tag of the SOARS docking port and maneuvers into alignment with the SOARS port. The AR tags allow the astrobee to identify the docking port and maneuver to the target. The AR tags, which are shown schematically in FIG. 5C, can contain various types of information of the docking port such as the type of docking interface, structural characteristics, pressure characteristics, the type of propellant/liquid that is provided at the docking port, operating pressures, etc. Other types of alignment tags can be used, such as QR (Quick Response) tags, RFID tags, etc. The astrobees can use internal sensors and controls for position-holding SOARS during operation. Then, the astrobee contacts the docking interface and the SOARS triggers the latching of the docking interface, tightens contact and seals the transfer lines. Servo-driven latching mechanisms and electrical contacts can be used within the docking interface to assist with the latching. Also, a multi-point circuit closure detector can be used within the docking interface to verify successful latching. In Phase 2, the SOARS spins up to a target angular velocity. In Phase 3, the air pumps turn on, pressure control solenoid valves (PCSV's) open to allow for pressurization. Once pressurized, flow transfer solenoid valves (FTSV's) open to allow liquid flow. Self-sealing ports for liquid and air allow for transfer between SOARS and the astrobee tanks. The PCSV's then can open and close to maintain a target pressure differential between the SOARS and astrobee tanks. Phases 1-3 can then be repeated with different operating parameters, such as different pressures, different angular velocities and different tank fills. The electronics enclosure shown in FIG. 5C can include microcontrollers, sensors, drivers, actuators and other electronics. Any type of a suitable microcontroller can be used such as two (2) teensy 4.1 Arduino-based microcontrollers. The microcontroller can be configured to execute software code to control the operation of the SOARS such as the rotational rate of the rotating tanks, tank pressures, and flow actuation. This software code architecture shown in FIG. 10 can be comprised of algorithmic modules to structure and store real-time system data, perceive system state, decide state change, and execute commands to maintain stable operation. The algorithmic modules, in their entirety or sub-section, can include some or all of the following module features: multi-modal data structuring and fusion, system and environment perception for machine situational awareness, system-environment state prediction and state change decision-making, and corrective action command and execution. Data ingestion and signal conditioning through the Sensor Interface pulls from multi-modal data streams (i.e., use cameras, pressures, flows, accelerations, torques). Structured data is stored in System Memory for downstream predictive functions and train leaning algorithms. Structured data is also passed downstream to the Perception Module, which can comprise of a system dynamics estimator to derive system-environment intrinsic and extrinsic parameters (i.e., system inertia, mass distribution, instability mode), and system and environment state classifiers to classify the system state based on sensor input and estimated derived parameters. The Decision Module takes in dynamics and state data to predict future system state using current classification and data streams, and to estimate the total system and environment state deviation across multi-dimensional target dynamics-state criteria. The Command Module takes in dynamics-state deviation data, in coordination with actuator and end-effector models (i.e., models of system components, such as thrusters, actuators, valves) and system reaction prediction models, to identify optimal corrective actions (e.g., pressurize, start transfer, change system attitude), to return system operation within target dynamics-states (e.g., mitigate instability, maintain state, or change state). All data and actions from these modules are tracked and stored in System Memory for training and optimization of learning algorithms within each module. Any or all system dynamics-state modules and algorithms may incorporate any combination of physics-based, heuristics-based, or empirically learned-trained real-time algorithmic models (e.g., neural networks). Modules and sections of this code may or may not be run simultaneously, in the background across multi-processor computer systems, and or sequentially in a reactive manner. Also, the electronics enclosure can include an on-board battery to supplement the astrobee batteries and/or other electrical systems.

Figure 8:
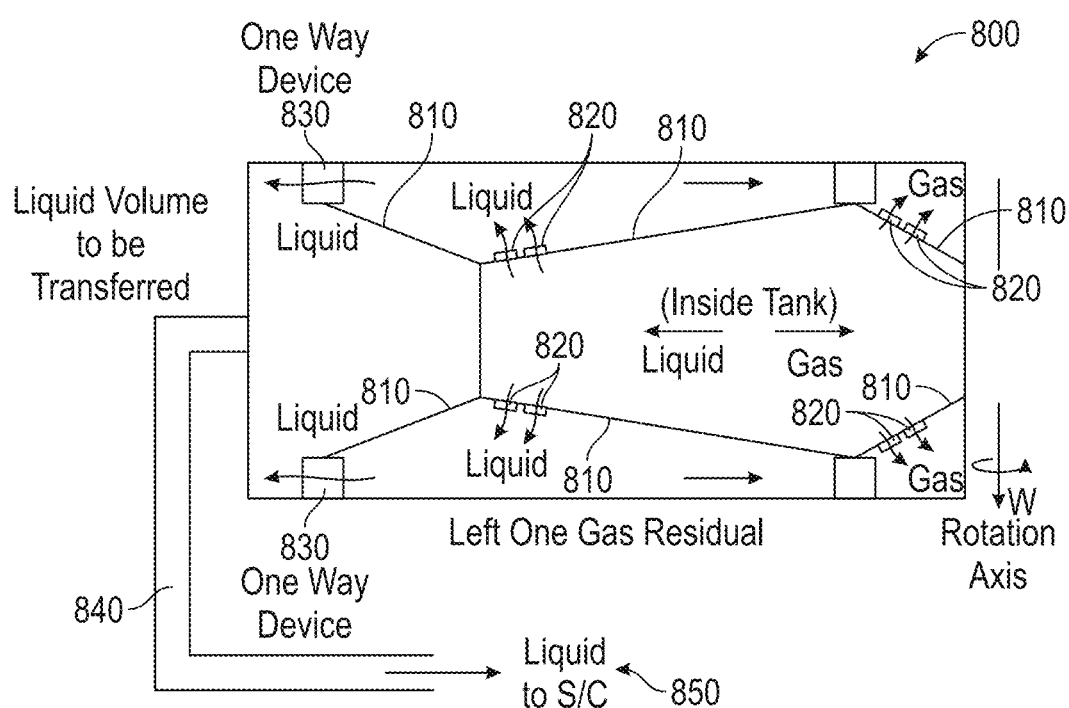
FIG. 8 shows another embodiment of the depot tank.

FIG. 8 shows an embodiment of a depot tank 800 that contains a liquid and a gas. As described above, the depot tank 800 is rotated about a shaft to induce the liquid to move towards the outer portion (left side) of the tank 800 and induce the gas to move towards the inner portion (left side) of the tank 800. Baffles are formed inside the tank 800 to help guide the liquid towards the outer portion of the tank 800 and the gas towards the inner portion of the tank 800 where they are collected and processed. As shown in FIG. 8, the depot tank 800 includes internal baffles 810 that can be used to channel/guide the fluid to the outer portion of the tank 800. The baffles can form converging sections that help move the liquid further outward and the gas further inward. Openings 820 can be formed in the baffles through which the liquid and gas travel to the outer and inner portion of the tank, respectively. These openings can be one-way devices 830, pass-through orifices, controlled flow channels that induce the desired flow regime. Depending on the fluid being stored and transferred, the openings can reduce flow, maintain pressure differential across the baffle, or manipulate the fluid characteristics (e.g., temperature, liquid-gas state change, density, etc.) in a one-way flow manner. A transfer flow path 840 connects the outer portion of the tank 800 to transfer the liquid to a spacecraft 850. The baffles can incorporate vanes or surface patterning of various dimensions and configurations to control flow regimes of the bulk fluid and the wall boundary layer. Also, vanes can be used induce or stabilize flow turbulence for adjusting flow parameters (e.g., pressure, flow rate, bulk density, etc.) prior to flowing into desired regions of tank or across a baffle. Micropatterning having boundary layers can be used to control or reduce wall shear loads or adjust free-surface energy of the fluid-wall interface to drive desired flow regime. Thermal control or actuation (e.g., electromagnetic, mechanical, etc.) of the baffle may also be used to perturb or induce desired flow across or through the baffle. The material used for the baffles can be selected based on fluid storage and flow requirements. The exact configuration (size, number, orientation, instrumentation, actuation, temperature, and material composition, etc.) of the baffles can be set based on the fluid storage and flow requirements.

Figure 9A:
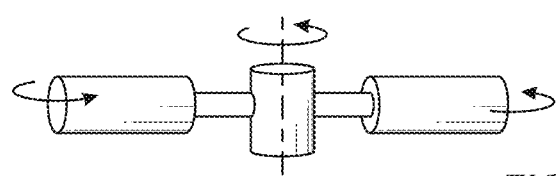
FIGS. 9A-9C show additional embodiments of the depot tanks.
Figure 9B:
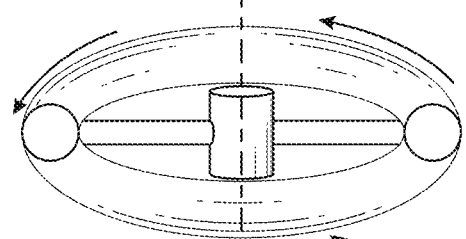
Figure 9C:
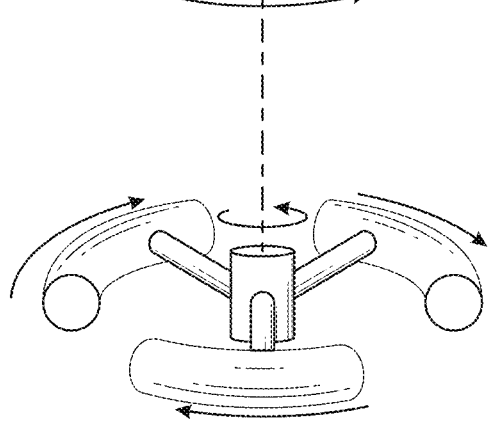

FIGS. 9A-9C shows additional embodiments of the depot tanks. As shown in FIG. 9A-9C, the depot tanks can be arranged in different configurations, all within the scope of the present invention. For example, in additional to the axial arrangement for two (2) tanks shown in FIG. 9A, the tanks could be arranged circumferentially as one tank, as shown in FIG. 9B. Alternatively, three (3) tanks can be used arranged toroidally as shown in FIG. 9C. In all of these embodiments, different sizes, shapes and materials can be used.

It should be understood that the invention is not limited by the specific embodiments described herein, which are offered by way of example and not by way of limitation. Variations and modifications of the above-described embodiments and its various aspects will be apparent to one skilled in the art and fall within the scope of the invention, as set forth in the following claims. For example, various materials, dimensions, fasteners, and connections could be used in the stairway and platform system without departing from the scope of the invention.

What is claimed is:

1. A spacecraft refueling and storage system comprising:
a first tank and a second tank for storing propellant;
 a rotatable shaft to which the first and second tanks are mounted for rotating the first and second tanks about an axis of the shaft;
 a drive motor for rotating the shaft so that upon rotation of the first and second tanks, liquid propellant is separated from gas in the propellant and settled to an outer portion of the first and second tanks;
 a first flow path formed in the shaft;
 a second and third flow path for transferring the settled liquid in the first tank and the second tank, respectively, to the first flow path; and
 a fourth flow path for transferring fluid from the first flow path to the spacecraft.

2. The spacecraft refueling and storage system of claim 1, further comprising: a housing for housing the first and second tanks; and
 an electronic enclosure that houses electronics for operation of the spacecraft refueling and storage system.

3. The spacecraft refueling and storage system of claim 2, further comprising a plurality of docking ports.

4. The spacecraft refueling and storage system of claim 1, further comprising:
 a rotary union and a slip ring integrated into the shaft that allows fluid and electrical transfer between the rotating tanks and the shaft.

5. The spacecraft refueling and storage system of claim 1, further comprising: pressure transducers for measuring pressure in the first and second tanks;
 flow transmitters for measuring fluid flow through the first, second, third and fourth flow paths; and
 transfer valves to control fluid flow in the first, second, third and fourth flow paths.

6. The spacecraft refueling and storage system of claim 1, further comprising a camera system for monitoring and assessing internal mass distribution in the system.

7. The spacecraft refueling and storage system of claim 1, wherein at least one of the first and second tanks comprises:
 internal baffles that guide the settled liquid to the outer portion of the tank; and
 openings formed in the baffles through which the settled liquid and gas travel to the outer and inner portion of the tank, respectively.

8. The spacecraft refueling and storage system of claim 7, wherein the baffles form converging sections that help move the settled liquid further outward and the gas further inward.

9. The spacecraft refueling and storage system of claim 8, wherein the openings can be one or more of: one-way devices, pass-through orifices, and controlled flow channels that induce the desired flow regime.

10. A refueling and storage system comprising:
 a first tank and a second tank for storing a fluid;
 a rotatable shaft to which the first and second tanks are mounted for rotating the first and second tanks about an axis of the shaft;

a drive motor for rotating the shaft so that upon rotation of the first and second tanks, liquid is separated from the fluid and settled to an outer portion of the first and second tanks;

a first flow path formed in the shaft;

a second and third flow path for transferring the settled liquid in the first tank and the second tank, respectively, to the first flow path; and a fourth flow path for transferring fluid from the first flow path to a client.

11. The spacecraft refueling and storage system of claim 7, wherein the baffles include micropatterning having boundary layers that control or reduce wall shear loads or adjust free-surface energy of a fluid-wall interface to drive desired flow.

12. The spacecraft refueling and storage system of claim 7, wherein the baffles are thermally controlled or actuated to perturb or induce desired flow across or through the baffles.

13. The spacecraft refueling and storage system of claim 7, wherein the baffles include vanes or surface patterning to control the flow of the liquid and a wall boundary layer.

14. The spacecraft refueling and storage system of claim 13, wherein the vanes can be used to induce or stabilize flow turbulence for adjusting flow parameters.

15. The spacecraft refueling and storage system of claim 1, further comprising a moving mass system for stabilizing and compensating for transient changes in mass distribution or maintaining attitude.

16. The spacecraft refueling and storage system of claim 1, wherein the first and second tank are formed as one tank.

17. The spacecraft refueling and storage system of claim 1, wherein the tanks are arranged axially, arranged circumferentially as one tank, or arranged toroidally.

18. The spacecraft refueling and storage system of claim 2, wherein the electronics comprises a microcontroller, the microcontroller being configured to control operation of the system and comprising a perception module, a decision module, and a command module.

* * * * *